UNITED STATES PATENT OFFICE.

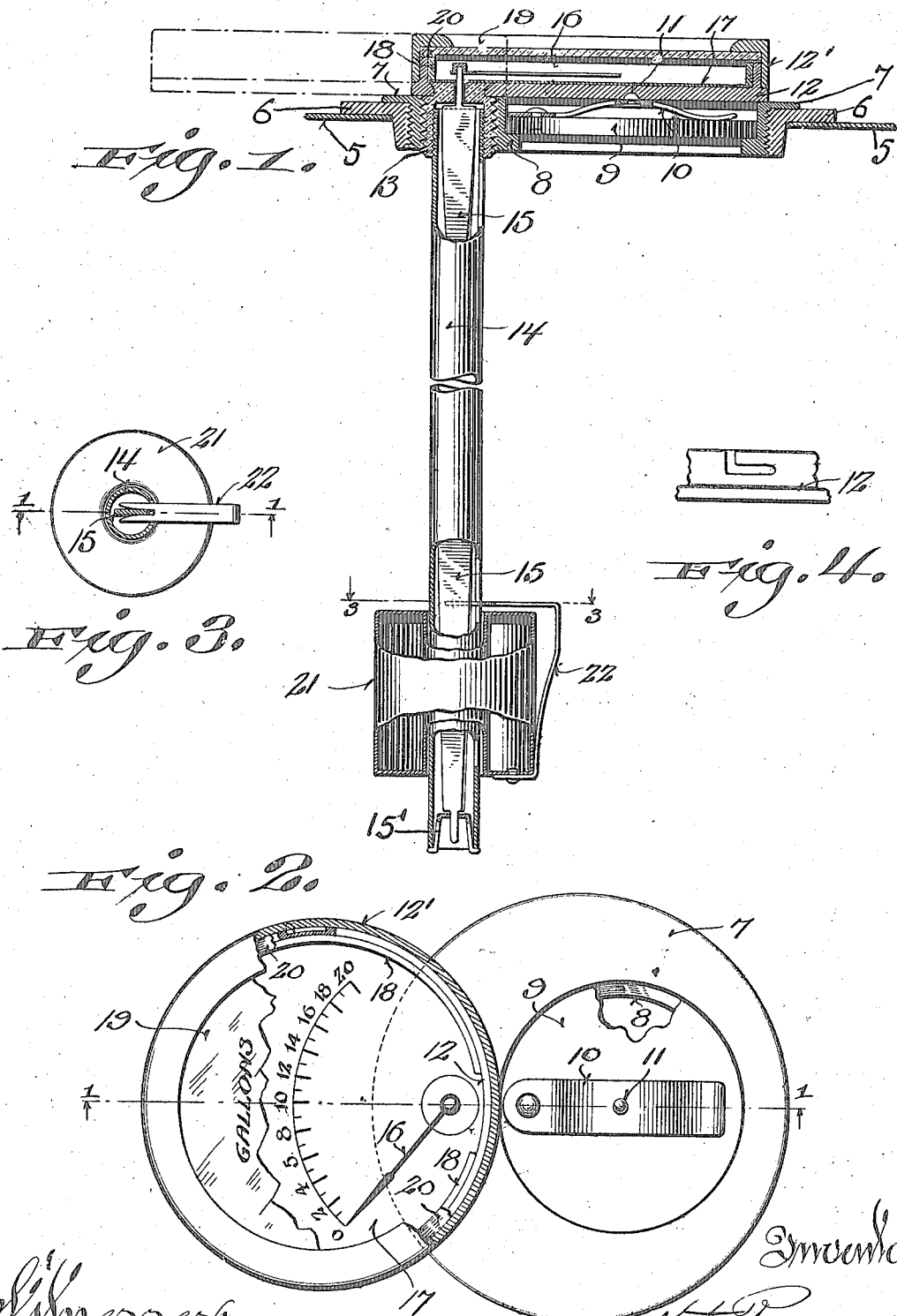

MARTIN RASMUSSEN, OF RACINE, WISCONSIN, ASSIGNOR TO BARTHOLOMEW C. THRONSON, OF RACINE, WISCONSIN.

TANK.

1,131,271. Specification of Letters Patent. Patented Mar. 9, 1915.

Application filed April 18, 1914. Serial No. 832,742.

*To all whom it may concern:*

Be it known that I, MARTIN RASMUSSEN, a subject of the King of Denmark, but having filed my intention to become a citizen of the United States, and resident of Racine, in the county of Racine and State of Wisconsin, have invented certain new and useful Improvements in Tanks; and I do hereby declare that the following is a full, clear, and exact description thereof.

My invention consists in what is herein particularly set forth with reference to the accompanying drawings and pointed out in the claims of this specification, as a combined filler-head and liquid-gage of a tank, its main object being to facilitate access to the tank and to utilize the chart and pointer casing of the gage as means for holding the closure-cap of the filler-head in place, said invention being especially designed for a hydrocarbon fuel-tank of a motor-vehicle.

Figure 1 of the drawings represents a partly sectional elevation of a combined filler-head and liquid-gage in accordance with my invention in connection with a fragment of a tank, the plane of the section being indicated by line 1—1 in Figs. 2 and 3; Fig. 2, a plan view of said head and gage partly in section, the gage being swung out of its normal position to the left; Fig. 3, a horizontal section indicated by line 3—3 in Fig. 1, and Fig. 4, an elevation of a fragment of the chart and pointer casing of the gage having a bayonet-joint slot.

Referring by numerals to the drawings, 5 indicates a fragment of a tank, 6 a bushing applied thereto and 7 a filler-head screw-threaded in the bushing. An opening in the filler-head is provided with an inner flange 8 that constitutes a seat for a cap 9 in the form of a flat plate that is substituted for the screw-cap of common knowledge. Fastened at one end by a rivet or otherwise to the top of the cap 9 is a semi-elliptic spring-plate 10 having a center knob 11 that therewith constitutes a latch for engagement with a central cavity in the underside of the chart and pointer casing 12 of a gage, by which to determine the liquid contents of the tank. The casing 12 is pivotal on the upper shouldered end of a recessed plug 13 that is screw-threaded in another opening in the filler-head. Screw-threaded in the plug 13 is the upper end of a longitudinally slotted tube 14, and within the tube is a spiral strip 15 reduced at its extremities to form pivots that turn in said plug 13 and a bearing 15' provided in the lower end of said tube. Fast on the upper pivot of the spiral-strip 15 is a pointer 16, and this pointer traverses a measuring-chart 17 held in said casing by a ring 18. The casing is preferably glazed, the glass 19 being set in upon a gasket 20 and held in place by a flanged ring section 12' of said casing. The ring section of the casing is preferably in bayonet-joint union with the remainder of said casing to facilitate its removal. Guided on the depending tube 14 is a float 21 and attached to the float is an angular spring-arm 22 having a notched end that extends through the slot of said tube and slides upon the spiral strip 15, whereby said strip is turned to actuate the pointer 16. The extent of the rise and fall of the float is predetermined by the length of the slot in the tube 14 through which the spring-arm 22 of said float extends. To detach the float its spring-arm 22 is withdrawn from the slot in the tube 14.

From the foregoing it will be understood that the gage may be readily assembled in connection with the filler-cap and as readily taken apart.

The casing part of the gage being in the position shown by full lines in Fig. 1, the spring 10 is contracted and the closure cap 9 for the opening in the filler-head held tight on its seat covered from dust and moisture. To obtain access to the tank, it is only necessary to swing the pivotal casing of the gage to the position shown by dotted lines in Fig. 1 as well as by full lines in Fig. 2, and then lift out the cap 9 of the filler-head opening, this being a simple and easy operation that may be quickly performed without the aid of a tool.

I claim:

1. The combination of a filler-head of a tank having an opening therein, a removable cap for which the opening in the head is provided with a seat, and a liquid gage having a chart and pointer casing thereof in pivotal connection with said head and normally positioned over said cap.

2. The combination of a filler-head of a tank having an opening therein, a removable cap for which the opening in the head is provided with a seat, a spring latch on the cap, and a liquid gage having a chart and pointer casing thereof in pivotal connection with said head and normally positioned over said cap and in engagement with said latch.

3. The combination of a filler head of a tank having an opening therein, a removable cap for which the opening in the head is provided with a seat, a plug in said head, a casing in pivotal connection with the plug and normally positioned over said cap, a longitudinally slotted tube depending from said plug, a spiral-strip having pivot ends that turn in the plug and a bearing provided in the tube, a float guided on said tube, a spring arm with the float extending through the tube slot and notched to engage the spiral-strip, the extent of play of the float being predetermined by the length of said slot, a pointer on the upper end of the pivot-end of said strip, and a measuring-chart stationary in said casing opposite the pointer.

4. The combination of a filler-head of a tank having an opening therein, a removable cap for which the opening in the head is provided with a seat, a plug in said head, a separable glazed casing in pivotal connection with the plug and normally positioned over said cap, a longitudinally slotted tube in detachable depending connection with said plug, a spiral-strip having pivot ends that turn in the plug and in a bearing provided in the tube, a float guided on said tube, a spring arm on the float and extending through the tube slot and notched to engage the spiral-strip, extent of play of the float being predetermined by the length of said slot, a pointer fast on the upper pivot end of said strip, and a measuring-chart stationary in said casing opposite the pointer.

In testimony that I claim the foregoing I have hereunto set my hand at Racine in the county of Racine and State of Wisconsin in the presence of two witnesses.

MARTIN RASMUSSEN.

Witnesses:
JOHN A. GEMMILL,
MYRTLE C. SCHMITT.